United States Patent
Kim et al.

(10) Patent No.: US 11,411,714 B2
(45) Date of Patent: Aug. 9, 2022

(54) APPARATUS AND METHOD FOR PERFORMING OPERATION USING APPROXIMATION FUNCTION

(71) Applicant: SAMSUNG SDS CO., LTD., Seoul (KR)

(72) Inventors: Eun Kyung Kim, Seoul (KR); Young Hyun Kim, Seoul (KR); Hyo Jin Yoon, Seoul (KR); Duk Jae Moon, Seoul (KR); Jung Hoon Sohn, Seoul (KR); Jin Hyuck Jeong, Seoul (KR); Seung Ro Joo, Seoul (KR); Seung Hyun Kang, Seoul (KR); Ki Hyo Moon, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 114 days.

(21) Appl. No.: 16/884,957

(22) Filed: May 27, 2020

(65) Prior Publication Data

US 2021/0203474 A1     Jul. 1, 2021

(30) Foreign Application Priority Data

Dec. 27, 2019  (KR) .......................... 10-2019-0176814

(51) Int. Cl.
*H04L 9/00*     (2022.01)
*G06F 17/17*    (2006.01)

(52) U.S. Cl.
CPC .............. *H04L 9/008* (2013.01); *G06F 17/17* (2013.01)

(58) Field of Classification Search
CPC ........... H04L 9/008; G06F 17/17; G06F 17/11
See application file for complete search history.

(56) References Cited

U.S. PATENT DOCUMENTS

| | | | |
|---|---|---|---|
| 2019/0363871 A1* | 11/2019 | Cheon | H04L 9/304 |
| 2020/0228307 A1* | 7/2020 | Cheon | H04L 9/3026 |
| 2020/0242466 A1* | 7/2020 | Mohassel | G06F 21/6254 |

FOREIGN PATENT DOCUMENTS

KR     10-1965628 B1     4/2019

OTHER PUBLICATIONS

European Search Report For EP20195188.6 dated Mar. 5, 2021 from European patent office in a counterpart European patent application.
Jung Hee Cheon et al., "Efficient Homomorphic Comparison Methods with Optimal Complexity", IACR, International Association for Cryptologic Research, vol. 20191021:082534, 2019, Retrieved from the internet: URL:http://eprint.iacr.org/2019/1234.pdf.
Jung Hee Cheon et al., "Numerical Methods for Comparison on Homomorphically Encrypted Numbers", IACR, International Association for Cryptologic Research, vol. 20190425:073431, 2019, Retrieved form the internet: URL: http://eprint.iacr.org/2019/417.pdf.

\* cited by examiner

*Primary Examiner* — Meng Li
(74) *Attorney, Agent, or Firm* — The PL Law Group, PLLC

(57) ABSTRACT

A method for performing an operation according to an embodiment includes assigning an error value to encrypted data; and performing a homomorphic operation for an approximation function, which is obtained by approximating a target function, by using, as an input value, the encrypted data to which the error value is assigned.

4 Claims, 3 Drawing Sheets

(a)

(b)

APPARATUS AND METHOD FOR PERFORMING OPERATION USING APPROXIMATION FUNCTION

CROSS REFERENCE TO RELATED APPLICATIONS AND CLAIM OF PRIORITY

This application claims priority to and the benefit of Korean Patent Application No. 10-2019-0176814, filed on Dec. 27, 2019, the disclosure of which is incorporated herein by reference in its entirety.

TECHNICAL FIELD

The disclosed embodiments relate to a homomorphic encryption technique.

BACKGROUND ART OF THE INVENTION

Homomorphic encryption is a state-of-the-art encryption technique that allows operations on encrypted data without decrypting the encrypted data, thereby allowing for analysis, such as machine learning and the like, while privacy of the data remains preserved.

In general, homomorphic encryption supports basic homomorphic operations, such as addition and multiplication, and hence it is possible to efficiently perform polynomial homomorphic operations using the homomorphic encryption. For operations other than polynomials, the homomorphic operations are often inefficient, and approximate polynomials are used to increase efficiency. However, in the case of an approximate polynomial, the accuracy of the calculation result decreases because there is an intrinsic limitation in that a difference from the actual value increases in a specific range (e.g., discontinuity), and if a higher-order approximate polynomial is used to overcome this decreases, a problem arises in that the efficiency decreases again.

SUMMARY

The disclosed embodiments are intended to provide an apparatus and method for performing an operation using an approximation function.

A method for performing an operation according to one embodiment includes assigning an error value to encrypted data; and performing a homomorphic operation for an approximation function, which is obtained by approximating a target function, by using, as an input value, the encrypted data to which the error value is assigned.

The approximation function may be a function obtained by approximating the target function by an $n^{th}$ order (where n is a natural number greater than or equal to 1) polynomial.

The encrypted data may be data encrypted using a homomorphic encryption algorithm that supports at least one of a homomorphic operation for multiplication and a homomorphic operation for addition, and the performing of the homomorphic operation may include performing the homomorphic operation for the approximation function by using at least one of the homomorphic operation for multiplication and the homomorphic operation for addition.

The assigning of the error value may include assigning the error value to the encrypted data by adding the error value to the encrypted data.

The assigning of the error value may include adding an error value satisfying the following Equation 1 to the encrypted data:

$$|f_n(x+e)-f(x)| \lesssim |f_m(x)-f(x)| \quad \text{[Equation 1]}$$

where $f(x)$ is the target function, $f_n(x)$ is the $n^{th}$ order polynomial, $f_m(x)$ is an $m^{th}$ order polynomial for the target function, m is a natural number (m≫n), and e is the error value.

The assigning of the error value may include assigning the error value to the encrypted data by multiplying the encrypted data by the error value.

The assigning of the error value may include multiplying the encrypted data by an error value satisfying the following Equation 2:

$$|f_n(ax)-f(x)| \lesssim |f_m(x)-f(x)| \quad \text{[Equation 2]}$$

where $f(x)$ is the target function, $f_n(x)$ is the $n^{th}$ order polynomial, $f_m(x)$ is an $m^{th}$ order polynomial for the target function, m is a natural number (m≫n), and a is the error value.

An apparatus for performing an operation according to one embodiment includes a memory in which one or more commands are stored; and one or more processor configured to execute the one or more commands, wherein the one or more processors assign an error value to encrypted data and perform a homomorphic operation for an approximation function, which is obtained by approximating a target function, by using, as an input value, the encrypted data to which the error value is assigned.

The approximation function may be a function obtained by approximating the target function by an $n^{th}$ order (where n is a natural number greater than or equal to 1) polynomial.

The encrypted data may be data encrypted using a homomorphic encryption algorithm that supports at least one of a homomorphic operation for multiplication and a homomorphic operation for addition, and the one or more processors may be further configured to perform the homomorphic operation for the approximation function by using at least one of the homomorphic operation for multiplication and the homomorphic operation for addition.

the one or more processors may assign the error value to the encrypted data by adding the error value to the encrypted data.

The one or more processors may add an error value satisfying the following Equation 1 to the encrypted data:

$$|f_n(x+e)-f(x)| \lesssim |f_m(x)-f(x)| \quad \text{[Equation 1]}$$

where $f(x)$ is the target function, $f_n(x)$ is the $n^{th}$ order polynomial, $f_m(x)$ is an $m^{th}$ order polynomial for the target function, m is a natural number (m≫n), and e is the error value.

The one or more processors may assign the error value to the encrypted data by multiplying the encrypted data by the error value.

The one or more processors may multiply the encrypted data by an error value satisfying the following Equation 2:

$$|f_n(ax)-f(x)| \lesssim |f_m(x)-f(x)| \quad \text{[Equation 2]}$$

where $f(x)$ is the target function, $f_n(x)$ is the $n^{th}$ order polynomial, $f_m(x)$ is an $m^{th}$ order polynomial for the target function, m is a natural number (m≫n), and a is the error value.

According to the disclosed embodiments, when a homomorphic operation is performed using an approximation function for a target function, an appropriate error value is applied to an input value, so that it is possible to improve the accuracy of the homomorphic operation and increase the computational efficiency at the same time even with the use of a low-order approximate polynomial.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

Figure 1:
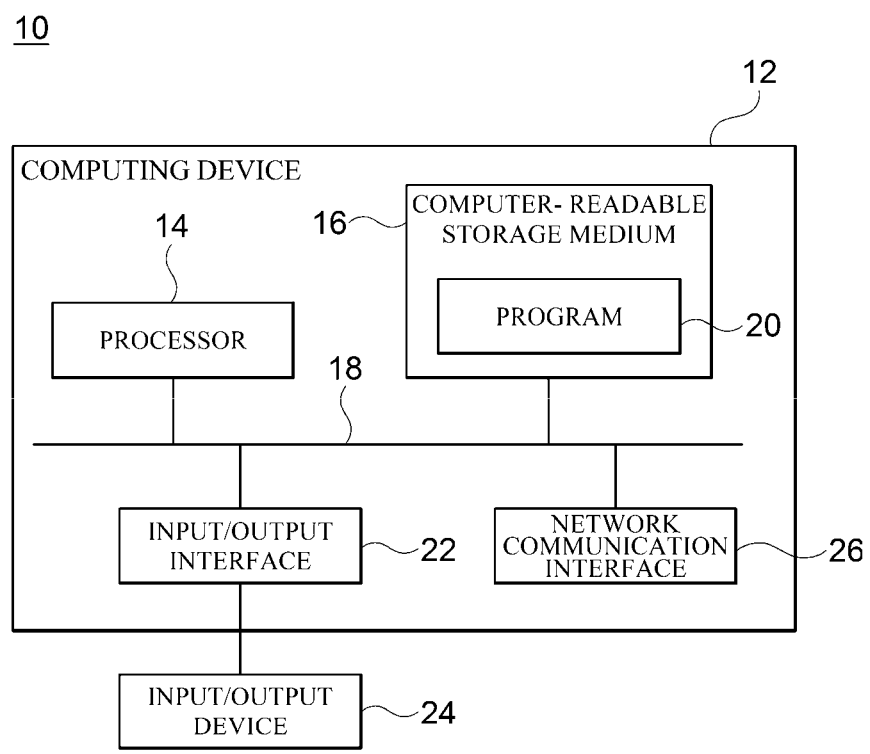
FIG. 1 is a block diagram illustrating a computing environment including a computing device suitable for use in exemplary embodiments.

FIG. 1 is a block diagram for describing a computing environment including a computing device suitable for use in exemplary embodiments. In the illustrated embodiment, each of the components may have functions and capabilities different from those described hereinafter and additional components may be included in addition to the components described herein.

The illustrated computing environment 10 includes a computing device 12. In one embodiment, the computing device 12 may be an apparatus for performing a ciphertext comparison method, which will be described below.

The computing device 12 includes at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable instructions, and the computer executable instructions may be configured to, when executed by the processor 14, cause the computing device 12 to perform operations according to the exemplary embodiment.

The computer-readable storage medium 16 is configured to store computer executable instructions and program codes, program data and/or information in other suitable forms. The programs stored in the computer-readable storage medium 16 may include a set of instructions executable by the processor 14. In one embodiment, the computer-readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

Figure 2:
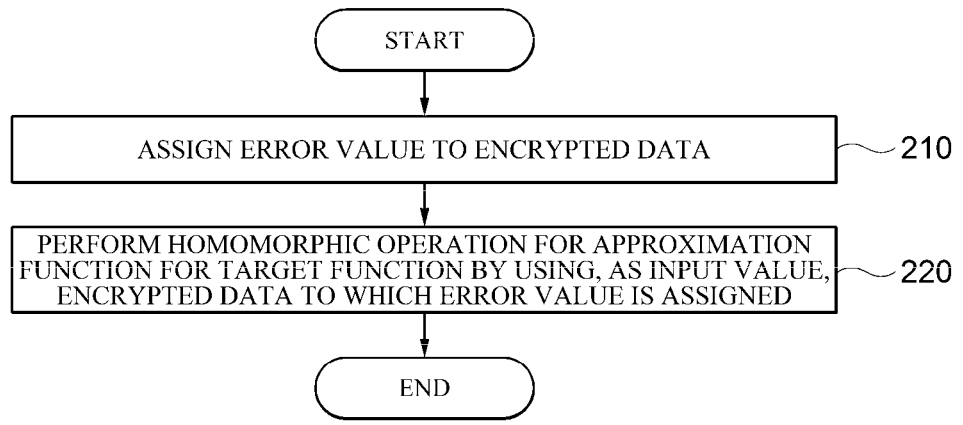
FIG. 2 is a flowchart illustrating a method of performing an operation using an approximation function according to one embodiment.

FIG. 2 is a flowchart of a method of performing an operation using an approximation function according to one embodiment.

Each of the operations illustrated in FIG. 2 may be performed by, for example, the computing device 12.

Referring to FIG. 2, first, the computing device 12 assigns an error value to encrypted data (210).

According to one embodiment, the encrypted data may be data encrypted using a homomorphic encryption algorithm. In this case, the homomorphic encryption algorithm may be one of various known homomorphic encryption algorithms that support at least one of a homomorphic operation for addition and a homomorphic operation for multiplication, but is not necessarily limited to a specific homomorphic encryption algorithm.

Meanwhile, when the homomorphic encryption algorithm supports a homomorphic operation for a specific operation, it may mean that a ciphertext for a result of applying a specific operation on a plaintext of the ciphertext can be generated by performing an operation on a ciphertext, which is encrypted using the homomorphic encryption algorithm, in an encrypted state. Specifically, a homomorphic operation ⊞ for addition, a homomorphic operation ⊡ for multiplication, and a homomorphic operation $\boxed{f}$ for function f may, respectively, satisfy Equations 1 to 3 below.

$$\text{Enc}(x_1) \boxplus \text{Enc}(x_2) \rightarrow \text{Enc}(x_1+x_2) \qquad \text{[Equation 1]}$$

$$\text{Enc}(x_1) \boxdot \text{Enc}(x_2) \rightarrow \text{Enc}(x_1 \cdot x_2) \qquad \text{[Equation 2]}$$

$$\boxed{f}(\text{Enc}(x)) \rightarrow \text{Enc}(f(x)) \qquad \text{[Equation 3]}$$

Meanwhile, the error value assigned to the encrypted data may be a preset value or a value randomly selected from among values within a preset range. For example, the error value or the range of the error value may be changed according to an embodiment in consideration of a target function, the order of an approximation function for the target function, the amount of calculation, the accuracy of the calculation, and the like.

Meanwhile, according to one embodiment, the computing device 12 may assign the error value to the encrypted data by adding the error value to the encrypted data.

According to another embodiment, the computing device 12 may assign the error value to the encrypted data by multiplying the encrypted data by the error value. Meanwhile, the computing device 12 assigns the error value to the encrypted data, and then performs a homomorphic operation for the approximation function obtained by approximating the target function using the encrypted data to which the error value is assigned as an input value (220).

According to one embodiment, the approximation function may be a function obtained by approximating the target function by an $n^{th}$ order polynomial (where, n is a natural number greater than or equal to 1). In this case, the order of the approximation function may be preset and be changed according to an embodiment in consideration of the amount of calculation, the accuracy of the calculation, and the like.

In one embodiment, the target function may be, for example, a polynomial function having a higher order than the approximation function, or a non-polynomial function that can be approximated by a polynomial, but is not necessarily limited to a specific function if it can be approximated by a polynomial.

Meanwhile, it is assumed that an $n^{th}$ order polynomial $f_n(x)$ and an $m^{th}$ order polynomial $f_m(x)$ (where m»n), which are obtained by approximating the target function f(x), satisfy Equation 4 or Equation 5 below for an input value x.

$$|f_n(x+e)-f(x)| \lesssim |f_m(x)-f(x)| \qquad \text{[Equation 4]}$$

$$|f_n(ax)-f(x)| \lesssim |f_m(x)-f(x)| \qquad \text{[Equation 5]}$$

In Equation 4, e is a small error value, which is a positive or negative number, and in Equation 5, a is an error value which is a positive number close to 1.

In this case, when the input values of $f_n(x)$ and $f_m(x)$ are the same, $f_m(x)$, which is an approximate polynomial of a higher order, may be closer to the target function f(x) than $f_n(x)$. However, when an input value x+e to which a satisfying Equation 4 described above is added, or an input value ax which is multiplied by a satisfying Equation 5 is used as an input value of $f_n(x)$, it is possible to obtain a result closer to the target function f(x) than when x is used as an input value of $f_m(x)$.

In addition, since the homomorphic operation for a polynomial may be performed through a combination of one or more of homomorphic operations for multiplication and homomorphic operations for addition, the amount of calculation and time required for calculation for a homomorphic operation for $f_n(x)$ may be reduced as compared to a homomorphic operation for $f_m(x)$.

As a result, when the homomorphic operation for $f_n(x)$ is performed by using, as an input value, a value obtained by adding the error satisfying Equation 4 or 5 described above to the encrypted data, the efficiency and accuracy of the operation may be improved, compared to when the homomorphic operation for $f_m(x)$ is performed by using, as an input value, the encrypted data itself, to which no error value is added.

As a specific example, a function g(x) that can be used for comparison between arbitrary numerical data a and b is assumed as shown in Equation 6 below.

$$g(x) = g(a-b) = \begin{cases} 1 & \text{if } x \geq 0 \\ 0 & \text{if } x < 0 \end{cases} \qquad \text{[Equation 6]}$$

Figure 3:
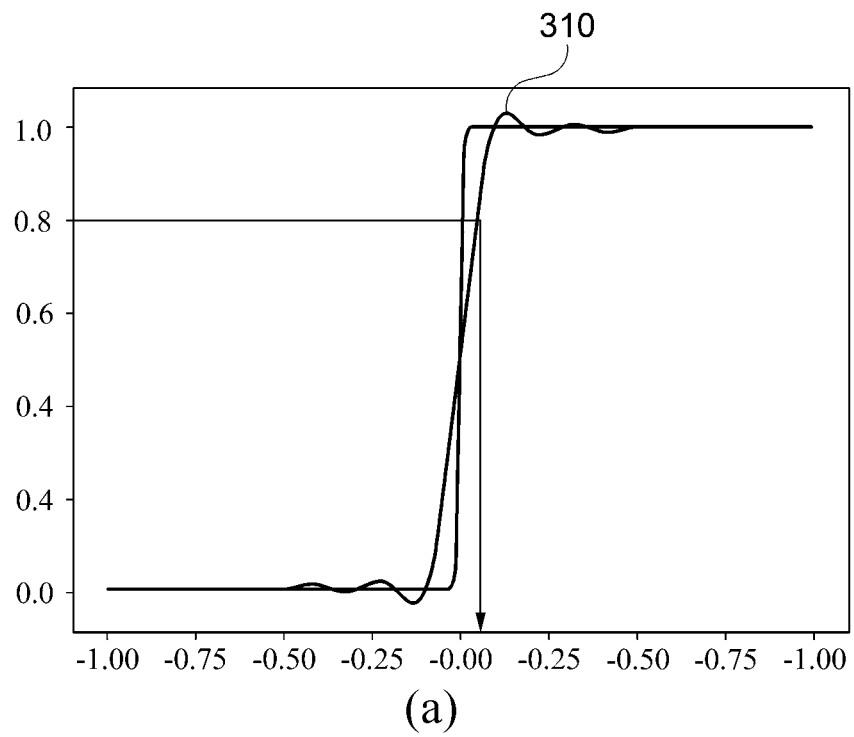
FIG. 3 is a diagram showing an example of a graph of an approximation polynomial.
Figure 3:
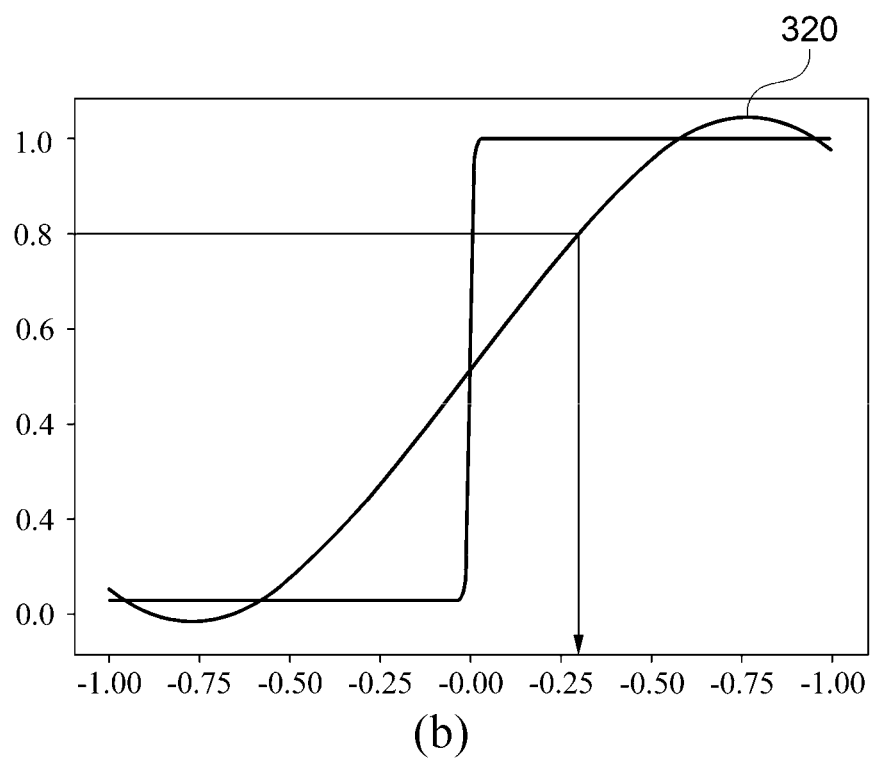

In this case, graphs of a $32^{nd}$ order approximate polynomial $g_{32}(x)$ and a $4^{th}$ approximate polynomial $g_4(x)$ obtained by approximating the function g(x) for x∈(0, 1) are shown in FIG. 3.

Referring to a graph 310 of $g_{32}(x)$ and a graph 320 of $g_4(x)$ shown in FIG. 3, the closer to x=0, which is a discontinuity point of g(x), the closer $g_{32}(x)$ is to g(x), compared to $g_4(x)$, but for a homomorphic operation for $g_{32}(x)$, a homomorphic operation for multiplication must be performed more than five times, and hence the time complexity increases compared to the homomorphic operations for $g_4(x)$.

Meanwhile, when $g_{32}(x) \approx 0.8$ at x=0.05, an error between $g_{32}(x)$ and g(x) at x=0.05 is $|g_{32}(x)-g(x)| \approx 0.2$. When x+e($\approx 0.26$) obtained by adding a small error value to x is used as an input value of $g_4(x)$, $g_4(x+e) \approx 0.8$ and an error between $g_4(x+e)$ and g(x) is $|g_4(x+e)-g(x)| \approx 0.2$, and thus $g_4(x+e)$ has a similar level of error to that of $g_{32}(x)$. That is, the homomorphic operation for $g_4(x+e)$ has a similar level of error to that of the homomorphic operation for $g_{32}(x)$, but the time complexity is greatly reduced because the homomorphic operation for multiplication is performed twice.

On the other hand, in decision tree learning, which is a type of machine learning/supervised learning, the goal is to organize feature values that best predict a label value of unlabeled data into tree-structured questions by using training data consisting of feature values representing features of data and labels representing result values.

Specifically, in decision tree learning, data is classified based on each feature and a tree model is generated from a root node in the order in which labels are well classified. In this case, as the measure for determining whether a label is well classified, Gini Index indicating impurity, information gain using entropy indicating uncertainty, or the like is used, and questions regarding the feature values are determined from the root node of the tree model in the order of smallest to largest impurity of data or in the order of largest to smallest information gain.

That is, in order to generate a tree model, access to a feature value having a maximum value or a minimum value of the measure of classification for labels (Gini index, information gain, etc.) is required, which may be performed using MaxIndex function, MinIndex function, or the like. In this case, MaxIndex function may be represented by, for example, Equation 7 below.

$$\text{MaxIndex}(a_1, a_2, \ldots, a_n) = (b_1, b_2, \ldots, b_n) \qquad \text{[Equation 7]}$$

Specifically, when a maximum value of MaxIndex function for n real numbers, $a_1, a_2, \ldots,$ and $a_n$, is $a_1$, $b_1=1$ is output, and when $a_i$ is not the maximum value, $b_i=0$ is output.

On the other hand, when $$b_i = \lim_{k \to \infty} \frac{a_i^k}{a_1^k + \ldots + a_n^k}$$

is defined for $½ \leq a_i < 3/2$ (i=1, 2, ..., n), MaxIndex function according to Equation 7, which has a maximum value of $a_i$, satisfies the following properties (1) and (2).

$$b_i = \lim_{k \to \infty} \frac{a_i^k}{a_1^k + \ldots + a_n^k} = \lim_{k \to \infty} \frac{1^k}{\left(\frac{a_1}{a_i}\right)^k + \ldots + 1^k + \ldots \left(\frac{a_n}{a_i}\right)^k} = 1 \quad (1)$$

$$\text{For } i \ne i', \; b_{i'} = \lim_{k \to \infty} \frac{a_{i'}^k}{a_1^k + \ldots + a_n^k} =$$

$$\lim_{k \to \infty} \frac{\left(\frac{a_{i'}}{a_i}\right)^k}{\left(\frac{a_1}{a_i}\right)^k + \ldots + 1^k + \ldots \left(\frac{a_n}{a_i}\right)^k} = 0 \left( \because 0 < \frac{a_{i'}}{a_i} < 1 \right) \quad (2)$$

For sufficiently large $$d, \; b_i = \lim_{k \to \infty} \frac{a_i^k}{a_1^k + \ldots + a_n^k} \approx \frac{a_i^d}{a_1^d + \ldots + a_n^d},$$

and thus $$b'_{i,d} := \frac{a_i^d}{a_1^d + \ldots + a_n^d}$$

may be considered as an approximate value of $b_i$, and as d increases, the error between the approximate value $b_{i,d}'$ and the true value $b_i$ decreases. In this case, $b_{i,d}'$ can be calculated using an approximate polynomial for 1/x as shown in Equation 8 below.

$$f(x) = \quad \text{[Equation 8]}$$

$$\frac{1}{x} = \frac{1}{1-(1-x)} = \prod_{i=0}^{\infty} \left(1 + (1-x)^{2^i}\right) \approx \prod_{i=0}^{d} \left(1 + (1-x)^{2^i}\right)$$

Meanwhile, when values of $a_i$ and $a_j$ ($a_i > a_j$) are close to each other, as d increases, convergence of $b_{i,d}' \to 1$ and $b_{j,d}' \to 0$ slowly occurs for $b_{i,d}' \approx b_{j,d}' \approx \frac{1}{2}$. Therefore, in order to obtain a valid result value for the MaxIndex function using a homomorphic operation, very large d has to be used, which greatly increases the time complexity. However, when a value of $(a_i + \epsilon_i) - (a_j + \epsilon_j)$ is increased by adding the error value to each of $a_i$ and $a_j$ as in the above-described embodiment, values approximate to $b_{i,d}' \to 1$ and $b_{j,d}' \to 0$ may be obtained for smaller d' (d'≪d), and the efficiency of the homomorphic operation may be improved.

While representative embodiments of the preset invention have been described above in detail, it may be understood by those skilled in the art that the embodiments may be variously modified without departing from the scope of the present invention. Therefore, the scope of the present invention is defined not by the described embodiment but by the appended claims, and encompasses equivalents that fall within the scope of the appended claims.

The invention claimed is:

1. A method for performing an operation, comprising:
assigning an error value to encrypted data; and
performing a homomorphic operation for an approximation function, which is obtained by approximating a target function, by using, as an input value, the encrypted data to which the error value is assigned,
wherein the approximation function is a function obtained by approximating the target function by an nth order (where n is a natural number greater than or equal to 1) polynomial,
wherein the assigning of the error value comprises assigning the error value to the encrypted data by adding the error value to the encrypted data, and
wherein the assigning of the error value comprises adding an error value satisfying the following Equation 1 to the encrypted data:

$$|f_n(x+e) - f(x)| \lesssim |f_m(x) - f(x)| \quad \text{[Equation 1]}$$

where $f(x)$ is the target function, $f_n(x)$ is the $n^{th}$ order polynomial, $f_m(x)$ is an $m^{th}$ order polynomial for the target function, m is a natural number (m≫n), and e is the error value.

2. A method for performing an operation, comprising:
assigning an error value to encrypted data; and
performing a homomorphic operation for an approximation function, which is obtained by approximating a target function, by using, as an input value, the encrypted data to which the error value is assigned,
wherein the approximation function is a function obtained by approximating the target function by an nth order (where n is a natural number greater than or equal to 1) polynomial,
wherein the assigning of the error value comprises assigning the error value to the encrypted data by multiplying the encrypted data by the error value, and
wherein the assigning of the error value comprises multiplying the encrypted data by an error value satisfying the following Equation 2:

$$|f_n(ax) - f(x)| \lesssim |f_m(x) - f(x)| \quad \text{[Equation 2]}$$

where $f(x)$ is the target function, $f_n(x)$ is the $n^{th}$ order polynomial, $f_m(x)$ is an $m^{th}$ order polynomial for the target function, m is a natural number (m≫n), and a is the error value.

3. An apparatus for performing an operation, the apparatus comprising:
a memory in which one or more commands are stored; and
one or more processors configured to execute the one or more commands, the one or more processors configured to:
assign an error value to encrypted data; and
perform a homomorphic operation for an approximation function, which is obtained by approximating a target function, by using, as an input value, the encrypted data to which the error value is assigned,
wherein the approximation function is a function obtained by approximating the target function by an nth order polynomial, where n is a natural number greater than or equal to 1,
wherein the one or more processors are configured to assign the error value to the encrypted data by adding the error value to the encrypted data, and
wherein the one or more processors are configured to add an error value satisfying the following Equation 1 to the encrypted data:

$$|f_n(x+e) - f(x)| \lesssim |f_m(x) - f(x)| \quad \text{[Equation 1]}$$

where $f(x)$ is the target function, $f_n(x)$ is the $n^{th}$ order polynomial, $f_m(x)$ is an $m^{th}$ order polynomial for the target function, m is a natural number (m≫n), and e is the error value.

4. An apparatus for performing an operation, the apparatus comprising:
- a memory in which one or more commands are stored; and
- one or more processors configured to execute the one or more commands, the one or more processors configured to:
- assign an error value to encrypted data, and
- perform a homomorphic operation for an approximation function, which is obtained by approximating a target function, by using, as an input value, the encrypted data to which the error value is assigned,
- wherein the approximation function is a function obtained by approximating the target function by an nth order polynomial, where n is a natural number greater than or equal to 1,
- wherein the one or more processors are configured to assign the error value to the encrypted data by multiplying the encrypted data by the error value, and
- wherein the one or more processors are configured to multiply the encrypted data by an error value satisfying the following Equation 2:

$$|f_n(ax)-f(x)| \lesssim |f_m(x)-f(x)| \quad [\text{Equation 2}]$$

where $f(x)$ is the target function, $f_n(x)$ is the $n^{th}$ order polynomial, $f_m(x)$ is an $m^{th}$ order polynomial for the target function, m is a natural number (m»n), and a is the error value.

* * * * *